United States Patent [19]

Antonen et al.

[11] 3,764,592

[45] Oct. 9, 1973

[54] SILICON-POLYBUTADIENE RESINS

[75] Inventors: Robert C. Antonen; Gust J. Kookootsedes, both of Midland, Mich.

[73] Assignee: Dow Corning Corporation, Midland, Mich.

[22] Filed: Nov. 24, 1971

[21] Appl. No.: 202,033

Related U.S. Application Data

[62] Division of Ser. No. 50,987, June 29, 1970, Pat. No. 3,333,067.

[52] U.S. Cl. ...... 260/94.2 R, 260/18 S, 260/46.5 P, 260/94.7 A, 260/94.7 HA, 260/94.7 R
[51] Int. Cl. .......................... C08d 5/02, C08d 5/04
[58] Field of Search .................. 260/94.7 A, 94.7 R, 260/94.7 HA, 18 S, 46.5 P, 94.21

[56] References Cited
UNITED STATES PATENTS

| | | | |
|---|---|---|---|
| 3,135,716 | 6/1964 | Uraneck et al. | 260/45.5 |
| 3,281,383 | 10/1966 | Zelinski et al. | 260/23.7 |
| 3,470,226 | 9/1966 | Plumb et al. | 260/94.7 R X |
| 3,655,598 | 4/1972 | Antonen et al. | 260/18 S |

*Primary Examiner*—Joseph L. Schofer
*Assistant Examiner*—William F. Hamrock
*Attorney*—Robert F. Fleming, Jr. et al.

[57] ABSTRACT

Silicone-polybutadiene resins wherein a siloxy-terminated polybutadiene having vinyl groups on alternate carbon atoms of the diene backbone is condensed by means of functionality on the silicon atoms with a hydroxyl-functional organo-silicon resin, the vinyl groups of the diene being cyclized by means of an organic peroxide catalyst, have utility as protective coatings.

7 Claims, No Drawings

SILICON-POLYBUTADIENE RESINS

This is a division of application Ser. No. 50,987, filed June 29, 1970 now U.S. Pat. No. 3,333,067.

This invention relates to silicone-polybutadiene resins. In one aspect, the invention relates to improved curable compositions useful as coatings for electrical coils and circuitry, as paitns, as resins for laminates and as molding compounds.

the invention provides siloxy-terminated butadiene polymers of the general formula

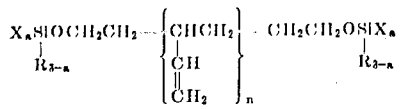

in which R is a monovalent hydrocarbon radical of from one to 18 inclusive carbon atoms; X is a hydrolyzable radical selected from the group consisting of the chlorine atom, alkoxy radicals of from one to six inclusive carbon atoms, acyloxy radicals of no more than eight carbon atoms and ketoxime radicals; $a$ is an integer having a value of 1 or 2 and $n$ is an integer having a value sufficiently high to provide a polydiene average moelcular weight in the range of rom about 500 to 3,000.

R can be any monovalent hydrocarbon radical of no more than 18 carbon atoms, for example, alkyl radicals, such as methyl, ethl, isopropyl, hexyl, dodecyl or octadecyl; alkenyl radicals, such as vincyl, allyl, hexenyl or propargyl; cycloaliphatic radicals such as cyclopentyl, cyclohexyl or cyclohexenyl; aromatic h drocarbon radicals such as phenyl, tolyl, xylyxl, xenyl, or naphthyl and aralkyl radicals such as benzyl, beta-phenylethyl, beta-phenylpropyl or gamma-tolylpropyl. Preferred R substituents are the methyl, pheynl and vinyl radiacals. The R usbstitutents on the same silicon atom can be the same or different and the two silicon atoms can contain the same or different R groups.

The hydrolyzable groups include the chlorine atom; alkoxy radicals, such as methoxy, ethoxy or butoxy; acyloxy radicals, such as acetoxy, propionyloxy or benzoyloxy, and ketoxime radicals of the formula $-ON=CZ_2$ or $-ON=CZ'$ in which Z is a monvalent hydrocarbon r radical such as those shown for R, and Z' is a divalent hydrocarbon radical, both valences of which are attached to the carbon atoms, such as hexylene, pentylene octylene or

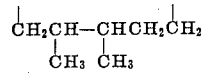

The preferred alkoxy radicals are thos having from one to six inclusive carbon atoms, preferred acyloxy radicals are those having less then eight carbon atoms. The ketoxime-functional silanes are well known as shown in U.S. Pat. No. 3,189,576.

These siloxy-terminated polybutadienes are prepared by reacting silanes of the formula $X_bSiR_{4-b}$, in which X and R are as defined above and $b$ is an integer having a value of 2 or 3, with dihydroxyl-terminated 1,2-polybutadiene. This chain extending reaction occurs at room temperature and can be carried out in a suitable solvent, such as toluene, xylene or tetrahydrofuran. To prevent premature hydrolysis of the siloxy functionality and gellation of the product the materials are reacted under anhydrous conditions. The condensation product, such as hydrochloric acid or methanol, can be removed by distillation or neutralizing the reaction mixture.

The dihydroxyl polybutadiene can be prepared by anionic polymerization of 1,3-butadiene in a solvent system containing an alkali metal to produce an alkali metal terminated polymer which is subsequently reacted with ethylene oxide and acidified to provide the hyroxyl functionality. The polybutadiene resin, containing pendent vinyl groups on alternate carbon atoms of the polymer backbone, and details of its preparation are disclosed in U.S. Pat. No. 3,431,235. The silane reactants are wellknown materials and include methyltrichlorosilane, phenylmethyldichlorosilane, ethyltrimethoxysilane, phenyltriethoxysilane, octylmethyldibutoxysilane, vinyltriacetoxysilane and methyltriketoximesilane.

The siloxy-terminated polybutadienes of the invention can be applied to a variety ofsubstrates and will air dry to provide a soft resionous tacky coating having adhesive properties. The air curing property results from the hydrolysis of the siloxy functionality in the presence of atmospheric moisutre. For example aluminum panels can be coated with a solution of the polymer and the solvent evaporated to provide an adhesive coating. A relatively hard resinous coating can be obtained by dispersing an organic peroxide catalyst in the resinous material and heating to about 150°C. the generation of free radicals promotes cross-linking and the cyclization of pendent vinyl groups on the diene backbone to form fused cycloaliphatic groups giving a hard thermosetting resin which serves as a protective coating for substrates, such as metal or wood.

Typical of the organic peroxide free radical generatiors are di-t-butyl periodide; 2,5-dimethyl-2,5-bis(tertiary butylperoxy)-hexane; n-butyl-4,4-bis(teritiary butylperoxy) valerate; tertiary-butyl perbenzoate; dicumyl peroxide; cumene hyperoxide; actyl peroxide; di-n-methyl-t-butyl percarbamate; t-butyl peracetate and t-butyl peroxyisobutyrate. Generally 0.5 to 5 weight percent, based on the weight of resin, of the peroxide catalyst is used.

The invention also provides curable compositions consisting essentially of a. 5 to 45 weight percent of a siloxy-terminated polybutadiene of the general formula

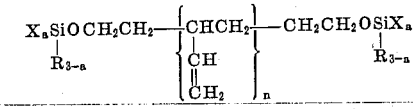

in which R is a monovalent hydrocarbon radical of from one to 18 inclusive carbon atoms, X is a hydrolyzable radical selected from the group consisting ofthe chlorine atom, alkoxy radicals of the chlorine atom, alkoxy radicals of from one to six inclusive carbon atmos, acyloxy radicals of no more than 8 carbon atoms and ketoxime radicals, $a$ is an integer of 1 or 2 and $n$ is an integer having a value sufficiently high to provide a polydiene average molecular weight of from about 500 to 3,000; and b. 55 to 95 weight percent of a hydroxyl-functional organosiliconresin consisting essentially of units of the formula $R'_cSiO_{(4-c)/2}$, in which R' is a monovalent hydrocarbon radical of from 1 to 6 inclusive carbon atoms, at least 70 mol percent of the R' substituents being selected from the group consisting of the methyl radical and the phenyl radical and $c$ has an average value of from 1 to 1.7, the organosilicon resin having a silicon-bonded hydroxyl content of from 1 to 10 weight percent, based on the weight of the resin.

The hydroxyl-functional organosilicon results are well-known and include those containing units such as $CH_3SiO_{3/2}$, $(CH_3)_2SiO$, $C_2H_5SiO_{3/2}$, $C_6H_5SiO_{3/2}$, $(C_6H_5)_2SiO$, $CH_3(CH_2=CH)SiO$, $C_3H_7(C_6H_5)SiO$, $CH_3(C_6H_5)SiO$, $(CH_3)_3SiO_{1/2}$, $C_6H_5(CH_2=CH)SiO$ and the like. These resins are easily prepared by hydrolysis of the corresponding chlorosilanes. Since it is desired to form a hard resinous product, at least 70 mol percent of the R' substituents must be methyl or phenyl radicals and the degree of substitution or average number of organic substituents per silicon atom must be in the range of from 1 to 1.7. Hard rigid products are obtained when resins having a low d.s. (degree of substitution) are used. In most end uses a certain amount of flexibility is desired, therefore resins having a d.s. in the range of from 1.3 to 1.5 are preferred.

The hydroxyl-functionality of the organosilicon resin provides reactive sites for condensation with the 27SiX functionality of the polybutadiene. This coupling of components (a) and (b) results in a compatible resin copolymer. The coupling reaction can be carried out in a suitable solvent, such as toluene at room temperature. The coupling reaction need not be catalyzed but the rate of reaction can be increased by the addition of mild condensation catalyst, such as the well-known amine or titanate catalyst, when the less reactive alkoxysilane-functionality is present in the polybutadiene.

The above-described compatible resin composition can be cured by means of two different mechanisms. First is by condensation of any silanol functionality remaining in the compatible resin composition. This condensation is affected by heating the resin at 150°C. or more in the presence of condensation catalysts such as dibutyl tin diacetate, lead naphthanate, cobalt naphthanate, zinc naphthanate, ferric octoate, chromium octoate, lead γ-ethylhexoate, dibutyl tin dibenzoate, dibutyltin adipate and lead sebacate. These are representative of the class of catalysts known in the art as the carboxylic salts of metals ranging from lead to maganese inclusive in the electro-motive series of metals. Other examples of classes of conventional silanol condensation catalysts, such as amines and titanates, are found in the prior art. The condensation catalysts are used in an amount in the range of from about 0.05 to 5 weight percent, based on the weight of the organosilicon resin component (b).

In a second curing system organic peroxide free radical generators, such as those described above, can be used in combination with the silanol condensation catalyst to provide a dual catalyst system for curing the composition. The organic peroxides are added in an amount in the range of 0.5 to 5 weight percent, based on the weight of resin (a). The above-described composition is heated at elevated temperatures to obtain the cured resinous product. Heating to temperature of from 150° to 300°C. for 1 ensures completion of both the condensation and cyclization curing reactions.

If desired, the organic peroxide catalyst can be used alone, relying entirely upon the cyclization of the polydiene to provide the curing. This is especially desirable when an organosilicon resin (b) having a low silanol content is used in forming the compatible resin composition.

A preferred embodiment of the invention resides in a composition consisting essentially of (a) 10 to 30 weight percent of the previously described siloxy-terminated polybutadiene in which the hydrolyzable group is an acyloxy radical and (b) 70 to 90 weight percent of the described organosilicon resin in which all of the R' substituents are selected from the group consisting of methyl and phenyl radicals. This composition has particular utility in the coating of metal articles.

The curable compositions of the invention are particularly suitable for coating pipes, containers and other items which are exposed to high temperatures and corrosive materials. Small amounts of other organopolysiloxanes can be added to the resin if it is desired to modify the properties of the cured product. For example, one weight percent of a phenylmethylpolysiloxane fluid can be added to give cured coatings which have release properties. Pigments and other fillers, such as silica, can also be added to the curable compositions.

The following examples are illustrative of the invention which is set forth in the claims.

EXAMPLE 1

A mixture of 100 grams of dihydroxyl polybutadiene resin having a molecular weight of about 2,000 and 17.4 grams of vinyltriacetoxysilane in 43 grams of toluene was agitated at room temperature for 45 minutes to produce a siloxy-terminated polybutadiene of the formula

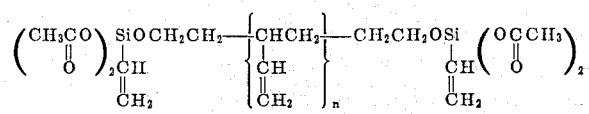

The solution of siloxy-terminated polybutadiene was added to a solution of 300 grams of organosilicon resin in 560 grams of toluene.

the resin consisted of methyl and phenyl siloxy units having a d.s. of 1.15 and a silicon-bonded hydroxyl content of about 6 weight percent. The mixture of resin solutions was stirred at room temperature for about 2 hours after which the resin mixture was compatible indicating coupling between the siloxy-terminated resin and the organosilicon resin. A total of 32 grams of calcium carbonate and 200 grams of toluene was added with stirring to the compatible resin in order to neutralize the acetic acid by-product of the reaction. The resin was filtered and about 200 grams of toluene were removed by distillation to obtain a compatible resin product in a 40% solids solution of toluene.

Ferric octoate (0.1 weight percent) and 2,5-dimethyl-2,5-bis(t-butylperoxy)hexane (1.0 weight percent) were added to the resin. The catalyzed resin solution was coated onto steel panels and allowed to drain dry to form a tack free coating. The coatings were cured at about 200°C. to obtain a hard resin film having excellent resistance to deterioration by steam and oil vapors.

EXAMPLE 2

Various amounts of vinyldiacetoxysilyl-endblocked polybutadiene having polydiene average molecular weights of 1,000 and 2,000 were mixed with various amounts of the hydroxyl-functional resin described in Example 1 to provide 50 percent solutions of the compatible resin in xylene. The resin solutions were catalyzed by the addition of ferric octoate (0.2 weight percent) and 2,5-dimethyl-2,5-bis(t-butylperoxy)hexane and 0.2 weight percent of a phenylmethyldimethylsiloxane copolymeric fluid was added to provide release characteristics.

Steel panels were dipped in each of the catalyzed resin solutions, allowed to air dry for a few minutes, and cured for 15 or 30 minutes at 400°F. The cured film on panels was evaluated for steam resistance, oil resistance, and slip angle. Steam resistance is determined by first observing the pencil hardness of the cured panel, placing the panel over a beaker of boiling water for 5 minutes, and again observing the pencil hardness of the cooled panel. Oil resistance is determined by placing the panel over a beaker of heated smoking cooking oil for 5 minutes and after cooling rubbing the panel with the peen end of a 3-pound ball peen hammer wrapped with four layers of cheese cloth. The coating is rated on the number of double rubs with the hammer necessary to break through the surface of the film. If 25 double rubs are obtained, the panel is placed over the hot oil for an additional five minutes and the procedure is repeated on a different section of the oil-exposed panel. This test is repeated through five sysles. The slipangle is the minimum anglethat permits a 154 gram weight (covered with cheese cloth) to slide down the panel. All of the panels had a slip angle of from 5 to 6.

The various resin formulations and curing conditions are given in Table I. The physical characteristics of the cured coatings are set forth in Table II.

TABLE I

| Formulation Number | Polydiene Molecular Weight Average | Weight Percent Siloxy-Polydiene | Weight Percent Organosilicon Resin | CURING Time-Minutes at 400°F. |
|---|---|---|---|---|
| 1 | 2000 | 25 | 75 | 15 |
| 2 | 2000 | 25 | 75 | 30 |
| 3 | 2000 | 20 | 80 | 15 |
| 4 | 2000 | 20 | 80 | 30 |
| 5 | 2000 | 15 | 85 | 15 |
| 6 | 2000 | 15 | 85 | 30 |
| 7 | 2000 | 10 | 90 | 15 |
| 8 | 2000 | 10 | 90 | 30 |
| 9 | 1000 | 25 | 75 | 15 |
| 10 | 1000 | 25 | 75 | 30 |
| 11 | 1000 | 20 | 80 | 15 |
| 12 | 1000 | 20 | 80 | 30 |
| 13 | 1000 | 15 | 85 | 15 |
| 14 | 1000 | 15 | 85 | 30 |
| 15 | 1000 | 10 | 90 | 15 |
| 16 | 1000 | 10 | 90 | 30 |

TABLE II

| Formulation number | Steam resistance Pencil hardness | | Oil resistance (hammer rubs per cycle) Number of cycles | | | | |
|---|---|---|---|---|---|---|---|
| | Before exposure | After exposure | 1 | 2 | 3 | 4 | 5 |
| 1 | 3H | 3H | >25 | >25 | >25 | >25 | >25 |
| 2 | 3H | 5H | >25 | >25 | >25 | >25 | >25 |
| 3 | 3H | 3H | >25 | >25 | >25 | >25 | 9 |
| 4 | 4H | 3H | >25 | >25 | >25 | 25 | 17 |
| 5 | 4H | 3H | >25 | >25 | 20 | 18 | 13 |
| 6 | 4H | 4H | >25 | >25 | >25 | >25 | 19 |
| 7 | 2H | 4H | 23 | 8 | 10 | 10 | 6 |
| 8 | 4H | 4H | >25 | 13 | 18 | 13 | 19 |
| 9 | 2H | 2H | >25 | >25 | >25 | 17 | >25 |
| 10 | H | 2H | >25 | >25 | >25 | >25 | >25 |
| 11 | 2H | 4H | >25 | >25 | 15 | 13 | 10 |
| 12 | 2H | 4H | >25 | >25 | 13 | 16 | 15 |
| 13 | 2H | 2H | 23 | 19 | 18 | 23 | 23 |
| 14 | 2H | 2H | >25 | >25 | >25 | 23 | 23 |
| 15 | 2H | 2H | >25 | >25 | 16 | 8 | 10 |
| 16 | 2H | 2H | >25 | >25 | >25 | 24 | >25 |

These data demonstrate the steam and oil resistance of the cured resin coating. Such a coating has particular utility in providing release of baked goods from pans.

EXAMPLE 3

Compatible resin-toluene solutions containing 10, 15 and 25 weight percent of vinyldiacetoxysiloxy-terminated polybutadiene (average molecular weight of 2,000) were prepared. The organosilicon resin component, present in 90, 85 and 75 weight percent, consisted of 76.5 mol percent $C_6H_5SiOO_{3/2}$, 15 mol percent $(CH_3)_2SiO$ and 8.5 $CH_3(C_6H_5)SiO$ units and had a $\equiv SiOH$ content of about 3 weight percent. These resin solutions, 0containing 50 percent solids, were catalyzed by the addition of 0.7 weight percent of iron octoate and 0.4 weight percent 2,5-dimethyl-2,5-bis(t-butylperoxy)hexane.

These resin solutions were formulated into paint compositions containing 20 parts $TiO_2$, 10 parts $Al_2O_3$, 1.5 arts of commercially available paint additives and 65.5 parts of the 50 percent solid resin solution. The pigmented resins were applied to aluminum panels by dip coating. The coatings were cured at 400°F. for 30 minutes. After cooling to room temperature, the mar resistance, hardness, gloss, and adhesion of the coatings were determined. The standard tests to determine crosscut adhesion and the Hoffman Scratch Test were used. Crosscut adhesion is determined by making a series of parallel cuts through the film in one direction and a second series of parallel cuts at right angles to the first. The cuts are preferably about 1/32-inch. apart. Scotch tape is placed over the crosscut area and then removed, the number of squares remaining intact give a quanitative meaure of adhesion. The test is described in detail in the *Paint Testing Manual, Physical and Chemical Examination, Paints, Varnishes, Laquers and Colors* by Gardner and Sward, Twelfth Edition, 1962.

The pencil hardness of the coating was alsodetermined at the 400°F. temperature.

The paint compositions and test results are given below:

| Paint vehicle resin composition | Crosscut adhesion, percent | Hoffman scratch test value | 60° gloss reading | Pencil hardness at— | |
|---|---|---|---|---|---|
| | | | | Rt. | 400° F. |
| 10 wt. percent polybutadiene resin / 90 wt. percent organosilicon resin | 100 | 3 | 63 | 2B | <2B |
| 15 wt. percent polybutadiene resin / 85 wt. percent organosilicon resin | 100 | 4 | 53 | 2B | <2B |
| 25 wt. percent polybutadiene resin / 75 wt. percent organosilicon resin | 100 | 5 | 53 | 1B | <2B |

EXAMPLE 4

Triacetoxysilanes were reacted with hydroxyl-terminated polybutadienes and the siloxy-functional diene was then reacted with an organosilicon resin having 1.9 weight percent silicon-bonded hydroxyl groups and consisting essentially of 15 mol percent $CH_3SiO_{3/2}$, 35 mol percent $C_6H_5Si_{3/2}$, 40 mol percent $(CH_3)_2SiO$ and 10 mol percent $(C_6H_5)_2SiO$ units. The polybutadiene was azeotroped with an equal volume of toluene to remove residual water. After cooling one mol of silane per 1,000 grams of diene resin was added and the mixture heated to about 130°C., with distillate being removed with the rise in temperature. After cooling, the described organosilicon resin and sufficient xylene to form a 60 percent solution was added to the siloxy-functional product. This mixture was heated at 140°C. until a compatible resin solution was obtained. Compatibility is visually determined by observing film clarity.

The amount and molecular weight of the hydroxyl-functional polybutadiene was varied, as was the composition of the silane reactant. The compatible resin formulations were catalyzed with 0.1 weight percent, based on the weight of the resin, of ferric octoate. Peroxide catalysts were not used. Portions of the catalyzed resin solution were mixed with pigments and additives to form a paint composition based on 65 weight percent of 1 50 percent solids resin solution.

Each of the resin solutions and paint compositions were used to dip coat aluminum panels. The coatings were cured for seconds at 250°C. Tack-free films were obtained in all cases. Thickness, hardness and flex characteristics of the cured films were determined. Table No. III gives the resin formulation and Table IV the physical characteristics of both the clear film and paint.

TABLE III

| Formulation number | Siloxy-functionality* percent in polydiene/polydiene molecular weight | Weight percent siloxy-terminated polybutadiene | Weight percent organosilicon resin |
|---|---|---|---|
| 1 | $(CH_3)(AcO)_2SiO-/2,000$ | 26.7 | 73.3 |
| 2 | $(CH_2=CH)(AcO)_2SiO-/2,000$ | 26.7 | 73.3 |
| 3 | $(CH_3)(AcO)_2SiO-/2,000$ | 13.3 | 86.7 |
| 4 | $(CH_3)(AcO)_2SiO-/1,000$ | 16.2 | 83.8 |
| 5 | $(CH_2=CH)(AcO)_2SiO-/2,000$ | 13.3 | 86.7 |
| 6 | $C_6H_5(AcO)_2SiO-/2,000$ | 14.1 | 85.9 |

*AcO—designates acetoxy radical.

TABLE IV

| Formulation number | Clear film properties | | | | Paint properties | | |
|---|---|---|---|---|---|---|---|
| | Thickness (mils) | Sward hardness | Pencil hardness | Flex | Thickness | Pencil hardness | Flex |
| 1 | 1.0 | 26 | 2B | 2T | 1.2 | F | 5T |
| 2 | 1.2 | 42 | HB | 2T | 1.0 | F | 7T |
| 3 | 1.0 | 20 | 2B | 1T | 1.1 | F | 4T |
| 4 | 1.0 | 10 | 2B | 0T | 1.1 | F | 3T |
| 5 | 1.0 | 22 | 2B | 1T | 1.3 | B | 4T |
| 6 | 1.0 | 18 | 2B | 1T | 1.2 | B | 4T |

EXAMPLE 5

A 50 percent solids solution of vinyldiacetoxysiloxy-terminated polybutadiene, having an average polydiene molecular weight of about 2000 and catalyzed by the addition of one weight percent of the peroxide used in Example 1, was used to form glass cloth laminates. The glass cloth was dripped in the resin solution and laid up with the warp threads rotated 90° in alternate plies to form a 14-ply laminate. The laminates had an average resin content of 29.3 weight percent. Laminates were cured for 24 and 72 hours at 160°C. The laminate cured for 24 hours had a room temperature flex strength of 16,650 psi, and the 72 hour cure gave a laminate having a flex strength of 23,000 psi.

This example demonstrates the use of the siloxy-functional resin as a binder for glass fabric and the resin functions equally well with other fibers, such as silica carbon black, and the like.

EXAMPLE 6

A mixture of 50 grams of dihydroxyl polybutadiene (molecular weight of about 2,000) and 5.6 grams of methyltrichlorosilane in 50 grams of toluene was reacted at room temperature to obtain methyldichlorosiloxy-terminated polybutadiene. Aluminum and steel panels were dipped into solutions and allowed to air dry for 48 hours, giving a soft, tacky film. The air-dried films were cured at 350°F. for 90 minutes to obtain a non-tacky coating having a pencil hardness of 2H.

About 1 weight percent of the peroxide catalyst described in Example 1 was added to the resin solution and aluminum panels were coated with the catalyzed resin. After air-drying for 30 minutes, the coatings were cured at 350°C. for 1 hour to give a relatively rigid resin having a pencil hardness of 2H.

EXAMPLE 7

A mixture of 50 grams of the polybutadiene used in Example 6 and 11.3 grams of $CH_3Si[ON=C(CH_3)(C_2H_5)]_3$ in 50 grams of toluene to yield methyl-di-methylethylketoxime siloxy-terminated polubutadiene. Films of the resin were coated onto aluminum panels and air-dried for 48 hours, after which the films retained their tacky adhesive characteristics. The films were then cured at 350°F. for minutes to obtain a non-tacky coating having a pencil hardness of 4H.

As in Example of 6, the resin solution was c atalyzed by addition of the same organic peroxide, coated onto metal panels and cured for 1 hour at 350°C. to give a relatively rigid resin having a pencil hardness of 6H. A comparison of these results with the results of Example 6 shows the superiority of the ketoxime functionality in providing hard coatings.

Reasonable modification and variation are within the scope of the invention which is directed to novel siloxy-terminated polybutadiene and curable compositions produced by their incorporation into hydroxyl-functional organosilicon resins.

That which is claimed is:

1. A siloxy-terminated butadiene polymer of the formula

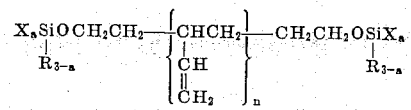

in which R is a monovalent hydrocarbon radical of from 1 to 18 inclusive carbon atoms, X is a hydrolyzable radical selected from the group consisting of the chlorine atom, alkoxy radicals of from 1 to 6 inclusive carbon atoms, acyloxy radicals of no more than 8 carbon atoms and ketoxime radicals; $a$ is an integer having a value of 1 or 2; and $n$ is an integer having a sufficiently high value to provide a polydiene average molecular weight in the rangeof about 500 to 3,000.

2. The polymer of claim 1 wherein X is an acetoxy radical.

3. The polymer of claim 1 wherein R is selected from the group consisting of methyl, phenyl and vinyl radicals.

4. The polymer of claim 1 wherein R is a vinyl radical, Xis an acetoxy radical and $a$ has a value of 2.

5. The polymer of claim 1 wherein R is a methyl radical, X is a methylethylketoxime radical and $a$ has a value of 2.

6. The polymer of claim 1 wherein Ris a methyl radical, X is a chlorine atom and $a$ has a value of 2.

7. Acurable composition comprising the polymer of claim 1 and from 0.5 to 5 weight percent, based on the weight of polymer, of an organic peroxide free-radical generating catalyst.

* * * * *